C. BUTTERS.
APPARATUS FOR FILTERING SLIMES.
APPLICATION FILED JUNE 11, 1913.
1,100,218.
Patented June 16, 1914.
3 SHEETS—SHEET 1.
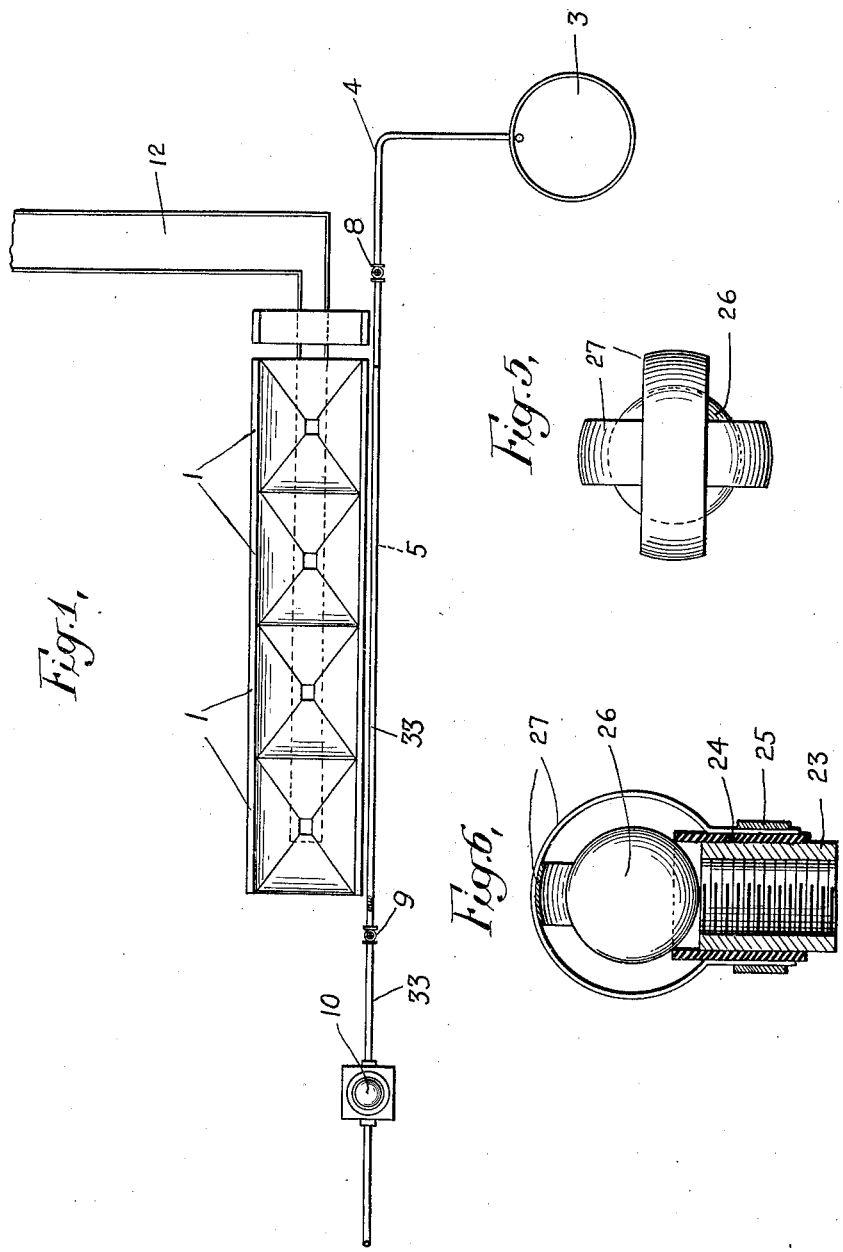

C. BUTTERS.
APPARATUS FOR FILTERING SLIMES.
APPLICATION FILED JUNE 11, 1913.
1,100,218.
Patented June 16, 1914.
3 SHEETS—SHEET 2.
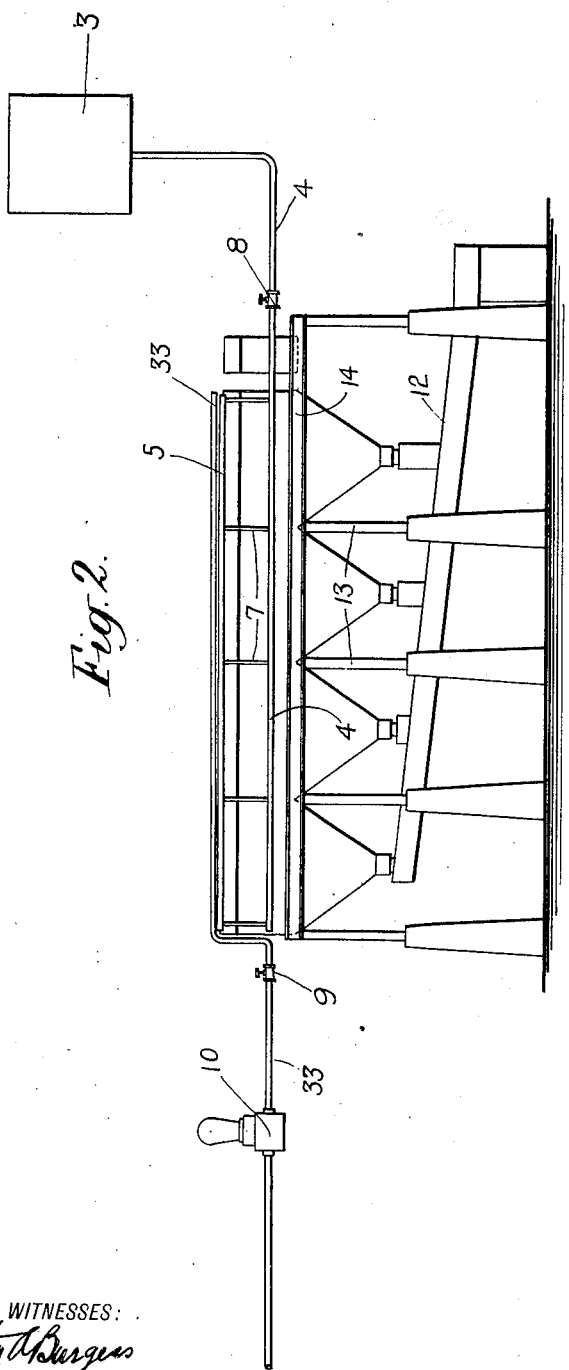
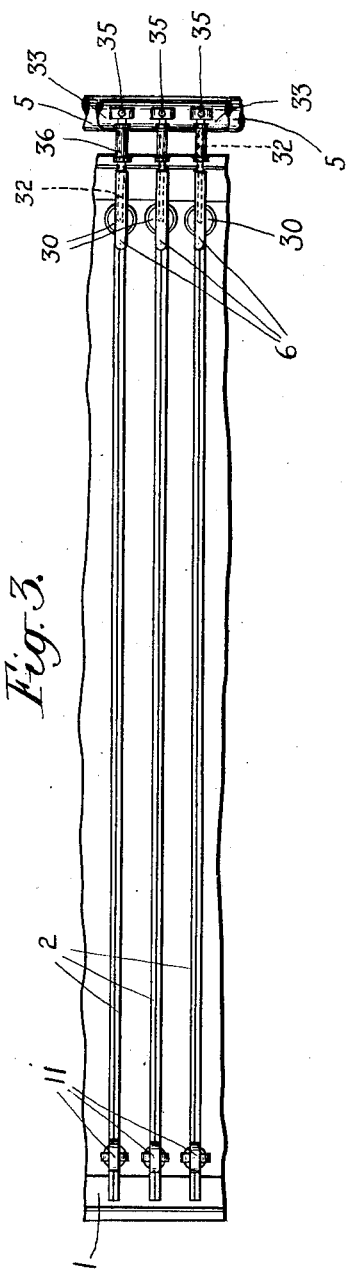
WITNESSES:
Newton A Burgess
John O. Templer
INVENTOR,
Charles Butters,
BY
Kenyon & Kenyon
his ATTORNEYS.

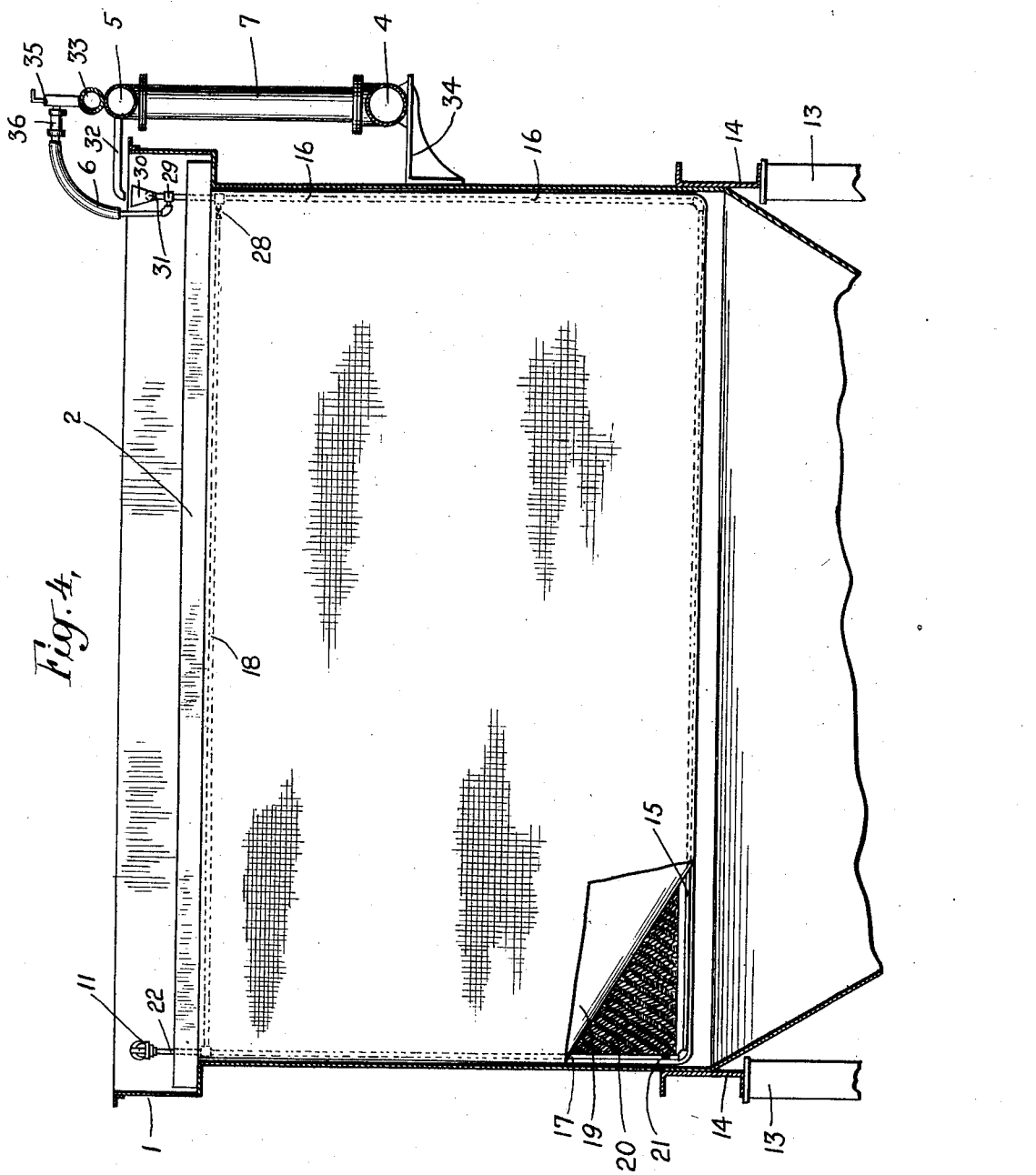

UNITED STATES PATENT OFFICE.

CHARLES BUTTERS, OF OAKLAND, CALIFORNIA.

APPARATUS FOR FILTERING SLIMES.

1,100,218.  Specification of Letters Patent.  Patented June 16, 1914.

Application filed June 11, 1913. Serial No. 772,945.

*To all whom it may concern:*

Be it known that I, CHARLES BUTTERS, a citizen of the United States, and a resident of Oakland, county of Alameda, State of California, have invented certain new and useful Improvements in Apparatus for Filtering Slimes, of which the following is a specification.

The object of my invention is to shorten the time taken for a cycle of operation in the process of filtering valuable compounds, such as slimes, which result from the well known cyanid process of treating ores.

Another object of my invention is to lower the cost of filter leaves while at the same time increasing their life and value.

In abstracting the values from slimes one of the most difficult and troublesome problems is to dislodge reliably and within an economical time, the slime cake from the surface of the filter medium after the filtering process has been completed, without injuring the filter surface of the leaf.

It has been the practice heretofore to dislodge slime cakes by air pressure placed on the interior of the leaves while suspended in the air, or this has been accomplished in some cases by water under pressure being passed through the filter medium in a direction reverse to that of the filtrate. It has been supposed heretofore that to dislodge the cake reliably and within an economical time, pressure was necessary whether of air, water or other fluid in the dislodging step, and special precaution has sometimes been taken to get a uniformly thick, cohesive and resistant cake deposit such that the fluid under pressure might dislodge it as an entirety and make it unnecessary to use additional means to dislodge the cake completely. By my process such uniformity of the cake is of no importance at all to the cake dislodgment, and consequently the filtering operation may be more economical.

If notable internal pressure is put on a leaf for cake-dislodgment purposes, means must be provided to prevent distension or ballooning of the filter medium. Various means have been devised to this end, all of which have added to the difficulty of cake-dislodgment. As a matter of practice, too, it is found that all such means are a hindrance to proper and economical operation; further, they shorten the life of the leaves, but have been regarded as indispensable when former practicable methods of cake-dislodgment have been used.

The efficiency of the leaves heretofore used is low, first, because a considerable amount of the surface of the filter medium is obstructed by the means used to prevent ballooning, such as strips down the sides; and second, because of stitching the media together or by bolting strips onto the outside of the leaf to prevent ballooning, comparatively large holes are made in the media. Also, these holes make the media more liable to rupture under internal pressure, thus shortening their life.

I have discovered that pressure is unnecessary to reliable cake-dislodgment within an economical time, and that complete success can be attained by saturation of the entire area of the filter medium. It is found in practice that these cakes have unusual adhesion and cohesion, and that when a cake is formed on each side of a filter leaf they are not easily dislodged. Due to the great cohesion of the cake it is very important that the upper part, as well as the other parts, of the filter medium be saturated in the dislodging step, as it is found that the adhesion of the cake to the medium is greatly lessened, and that the time for dislodgment is materially shortened thereby. This has not been attained in leaves heretofore constructed because they contained enough air to prevent water reaching the top part thereof even when admitted under pressure. This was true in spite of the fact that the leaf might be under vacuous conditions at the time the water was first admitted.

In some cases it is found advisable to admit the water (for dislodging the cake by saturation of the filter media) into the leaf without pressure and more or less slowly, and in order to do this I make use of a connection to the water supply by which the water going into the leaf cannot be under pressure, and, therefore, no pressure can be exerted inside the leaf. I have, therefore, devised a leaf which cannot have internal pressure applied thereto during the dislodging step since by my invention the cake can be dislodged within a practicable and economical time without any internal pressure whatever. It is understood that the cake may be, and preferably is, dislodged while the leaf is submerged in wash water. This means that there will be considerable hydrostatic pressure on the outside of the leaf. It has been found by experiment that the difference in specific gravity of the more or less dirty tank wash water and the relatively clean cake dislodging water would be sufficient to maintain a column of the relatively clean water inside the leaf several inches higher than the level of the tank wash water, so that the relief valve and the inlet for the cake-dislodging water may be several inches above the surface of the tank wash water without producing greater pressure inside the leaf than the outside pressure on the leaf.

The above fact is useful in practice as it gives considerable latitude between the level of the tank wash water and that of the inlet for the cake-dislodging water, and of the relief valve, thus preventing the entrance of the tank wash water into the leaf, while at the same time preventing excess of internal pressure. It will be seen, therefore, that the external hydrostatic pressure may be balanced but can never be exceeded by the internal hydrostatic pressure.

The above facts make it possible in my type of leaf to saturate the entire filtering surfaces, to use a lighter filter cloth and to dispense with all manner of bracing, stitching or other surface-roughening means which have heretofore been necessary to prevent ballooning. The absence of these means makes the cake-dislodging problem an easier one.

Other advantages will be apparent from the following detailed description taken in connection with the accompanying drawings, in which—

Figure 1 shows a diagrammatic plan view of a general layout showing a clean water source and piping for supplying the water to the leaves; Fig. 2 is a side elevation of the devices shown in Fig. 1; Fig. 3 is a plan of a portion of a vat with several leaves therein; Fig. 4 is a view of a leaf embodying my invention; Fig. 5 is a plan view of a relief valve; and Fig. 6 is a section of a relief valve.

In Fig. 1 are shown a plurality of vats 1 in which the leaves 2 are placed as shown in Fig. 3. These leaves are connected with the clean water source 3 by means of the piping 4, 5, 32 and the funnel 30. The leaves are connected with the vacuum-pump by means of the pipe 33 and connections 6. Between the connections 6 and the pipe 33 is a valve member 35 and a glass section 36. The valves 35 may be used to cut off any leaf. By means of the glass 36 the color of the filtrate can be observed. The pipes 4, 5 and 33 may be suitably supported, as for instance, by the member 34 attached to the side of the vat 1. In order that the water may reach all of the leaves quickly the pipe 5 as arranged along the top of the vats and is connected with the pipe 4 from the water supply by means of risers 7. In pipe 4 is placed the valve 8 by which the clean water supply for cake-dislodging purposes may be controlled. In the pipe 33, leading to the vacuum-pump, is placed the valve 9 by which the pump may be connected with, or disconnected from, the leaves as desired. The pump 10 is shown connected with the pipe 33 for the purpose of creating a vacuum within the leaves during the filtering operation, also during the cake-washing period.

When it is desired to begin the filtering operation, the valve 8 is closed, the valve 9 opened and the pump 10 started to decrease the pressure within the filter leaves, and thereby draw a filtrate through and form a cake on the surface of the filter medium. When sufficient cake has been formed, it may be treated in well known ways with barren solution and then with wash water, and it is then ready to be dislodged. The valve 9 may then be closed and the valve 8 is opened thereby permitting the water to run into the leaves from the tank 3 through the piping 4, risers 7, pipes 5 and 32 and funnel 30, thus filling the leaves, and causing the cakes to drop within four or five minutes. The air contained in the leaves is discharged through the relief vaves 11. The thick slime is then run out from the bottom of the vats into the run-way 12, and thence to the slime-pit. The vats may be properly supported by any convenient means such as the pillars 13 and I-beams 14, shown in Fig. 4.

As shown in Fig. 4, the leaf comprises a frame having members 15, 16, 17 and 18, preferably of tubing. Over this frame is secured a filter medium 19 of canvas or other suitable material. Inside the filter-leaf is a fibrous filler 20 preferably of cocoa mat, for holding the sides thereof apart when vacuum is created within the leaf. The lower frame member 15 is perforated or slotted along its upper side and is connected to a vacuum pump 10, or other pressure-decreasing means through the right-hand end member 16, the connection 6 and the pipe 33. The connection 6 may be of any suitable material preferably of rubber. The filtrate is removed from the leaf by means of the pump through these connections. The left-hand frame member 17 is plugged by any suitable means such as a wood plug shown at 21 in Fig. 1. The top frame member 18 is perforated or slotted along its lower side and to this member is attached the relief valve 11. This member is also plugged as shown at 28, and is rigidly connected to the right-hand end member to make a rigid frame structure. It is not necessary that the relief valve be connected to the frame member, but this arrangement is preferred and it is so illustrated in the drawings. The pipe 22 connecting the valve to the leaf may be of any suitable length. The relief valve 11 should be connected to the upper portion of the leaf in order to allow the escape of air.

Connected by any suitable fixture 29 to the members 6 and the right-hand end frame member 16 is a funnel 30. Placed within this funnel is a ball or other valve member 31. At the proper points along the piping 5 are arranged pipes 32 adapted to discharge water into the funnels and therethrough into the leaves. These pipes get their water supply from the tank 3 as heretofore described. When it is desired to admit water into the leaf for dislodging the cake the valve members 31 will be removed from the funnels so that water may readily pass into the leaves. The function of the balls or other valve members is to prevent the entrance of air into the leaves while the vacuum is on leaves, and consequently the balls will be replaced in the funnels when it is desired to begin the filtering. For the purpose of illustration the valves are shown in the funnels but other forms of valve may be used provided there is an opening to atmosphere in the clean water supply pipe near its point of attachment to the leaf in order to prevent internal pressure within the leaf. By the use of this means it will be seen that no internal pressure in the leaf is possible while at the same time the air will be prevented from entering the leaf during the time vacuum is on, and also the air contained in the leaf, at the time it is desired to discharge the cake, will be permitted to escape through the relief valve 11, when the clean water is admitted and begins to fill up the leaf. This action is due to the difference in specific gravity of the tank wash water, the clean cake-dislodging water, and the air, as will be readily understood. By allowing the leaf to be filled comparatively slowly with water the air will have time to escape from all parts of the leaf without being entrapped, as a result of which the filter medium will be completely saturated and the cake will be readily dislodged after the water has completely filled the leaf.

The preferred form of relief valve is shown in detail in Figs. 5 and 6, but other kinds of valve may be used provided they allow exit but prevent entrance of air. The valve hereafter described is by way of example only and must not be considered as limiting my invention. As shown in Figs. 5 and 6, the relief-valve consists of a pipe-coupling 23 around which is securely clamped a rubber tube 24, the upper end of which acts as a valve seat. This tube is clamped around the coupling 23 by a band 25 in any well known manner. Arranged to coöperate with the seat 24 is a ball 26 of rubber. For the purpose of confining the movement of the ball, guards 27 are placed around same, as clearly shown in the drawing.

It will be readily understood that by the use of a valve of the kind above described, the entrance of air will be entirely prevented when vacuum is created within the leaf, thereby not interfering in any way with the filtering properties of the leaf. As soon as the vacuum is relieved, the elasticity of the seat will push the ball up, and due to unavoidable irregularities, small passages will exist between the ball and its seat sufficient to allow the escape of whatever air remains in the leaf as water is admitted thereto. By this arrangement the air may be easily displaced by water when the latter is admitted to the leaf so that it can saturate the entire surface of the filter media, and cause a rapid dislodgment of the cake. The water for this purpose is supplied from any suitable supply 3 as heretofore described.

In Fig. 3 is illustrated a series of leaves 2 placed on the sides of a vat, 1.

The operation of my device is as follows:—The leaf is completely submerged, care being taken not to allow slimes to enter the relief-valve or the funnel. The balls are placed in the funnels. Suction is applied to the interior of the leaf by any means, such as a vacuum-pump, and the filtrate is carried off by the pressure-decreasing means. As soon as the internal pressure is decreased, the relief-valve and the funnel-valve close tight so as to completely prevent the entrance of air. The suction is continued until a cake of proper thickness is deposited on the filter surface. This cake may then be variously treated with barren solution and wash water, and then the vacuum is turned off, the valve members are moved from the funnels, and water is introduced through pipes 32 into the funnels, and is conducted into the bottom frame member 15, the leaf being still submerged. As the water rises in the leaf, the air passes out through the relief-valve 11 so that the water rises to the top of the leaf, completely fills it and so saturates the entire surface of the filter media, thereby causing the cake to be rapidly dislodged. The filter medium is thereby cleansed, and is ready for another cycle.

Having described my invention, what I claim as new, and desire to secure by Letters Patent, is:—

1. In a suction filter leaf, the combination of a frame, filter media carried thereby and a water supply pipe for cake dislodging purposes connected to said leaf, said pipe having an opening to atmosphere near its point of attachment to the leaf.

2. In a suction filter leaf, the combination of a frame, filter media carried thereby, a water supply pipe for cake dislodging purposes connected with said leaf, and a funnel in said pipe near its point of connection to said leaf.

3. In a suction filter leaf, the combination of a frame, a filter media carried thereby and a water supply pipe for cake dislodging purposes connected to said leaf, said pipe having a valve-controlled opening therein near the point of attachment of said pipe to the leaf.

4. In a suction filter leaf, the combination of a frame, filter media carried thereby, a water supply pipe connected to said leaf, a funnel placed in said pipe near its connection with said leaf, and a valve in said funnel.

5. In a suction filter leaf, the combination of a frame having passages in certain members thereof, a water supply pipe for cake dislodging purposes connected with the bottom frame member, said pipe having a funnel therein, and a relief valve connected to said leaf.

6. In a suction filter leaf, the combination of a frame having passages connected with the interior and exterior of said leaf, filter media therefor, a relief valve connected with the upper portion of the leaf, a water supply pipe for cake dislodging purposes connected with the lower portion of said leaf and means for preventing pressure in said pipe.

7. In a suction filter leaf, the combination of a frame, the top and bottom members of said frame being perforated and opening internally of said leaf, an automatic relief valve connected with said upper member, and a water supply pipe connected with the lower member, a funnel in said pipe, and a ball valve in said funnel.

In testimony whereof, I have signed my name to this specification, in the presence of two subscribing witnesses.

CHARLES BUTTERS.

Witnesses:
  NEWTON A. BURGESS,
  EDWIN SEGER.

---

Copies of this patent may be obtained for five cents each, by addressing the "Commissioner of Patents, Washington, D. C."